United States Patent
Ellensohn et al.

(10) Patent No.: US 7,954,320 B2
(45) Date of Patent: Jun. 7, 2011

(54) ENGINE APPARATUS WITH HEAT RECOVERY SYSTEM AND RELATIVE HEAT RECOVERY METHOD

(75) Inventors: Rudolf Ellensohn, Au (CH); Wolfgang Gstrein, Arbon (CH)

(73) Assignee: Iveco Motorenforschung AG, Arbon (CH)

( * ) Notice: Subject to any disclaimer, the term of this patent is extended or adjusted under 35 U.S.C. 154(b) by 664 days.

(21) Appl. No.: 11/975,237

(22) Filed: Oct. 18, 2007

(65) Prior Publication Data

US 2008/0092540 A1    Apr. 24, 2008

(30) Foreign Application Priority Data

Oct. 24, 2006   (IT) ................ MI2006A2046

(51) Int. Cl.
  *F01K 23/10*   (2006.01)
  *F02G 5/02*    (2006.01)
  *F02G 5/04*    (2006.01)

(52) U.S. Cl. ........................................... 60/618

(58) Field of Classification Search ............ 60/618–619, 60/597; F02G 5/04, 5/02; F01K 23/10
See application file for complete search history.

(56) References Cited

U.S. PATENT DOCUMENTS

| | | | | |
|---|---|---|---|---|
| 3,541,783 | A | * | 11/1970 | Schmuck ........................ 60/618 |
| 5,609,029 | A | * | 3/1997 | Ahnger et al. .................. 60/618 |
| 7,036,313 | B1 | * | 5/2006 | Weaver .......................... 60/618 |

FOREIGN PATENT DOCUMENTS

| | | | |
|---|---|---|---|
| DE | 33 26 992 | | 12/1984 |
| DE | 197 42 031 | | 3/1999 |
| EP | 60159 | A1 * | 9/1982 |
| EP | 1 536 116 | | 6/2005 |
| GB | 2 010 970 | | 7/1979 |
| JP | 55043205 | A * | 3/1980 |
| JP | 57091310 | A * | 6/1982 |
| JP | 58053608 | A * | 3/1983 |
| JP | 58220945 | A * | 12/1983 |
| JP | 61244806 | A * | 10/1986 |
| JP | 02 153227 | | 6/1990 |
| JP | 6033707 | A * | 2/1994 |

* cited by examiner

*Primary Examiner* — Thai Ba Trieu
(74) *Attorney, Agent, or Firm* — Stetina Brunda Garred & Brucker

(57) ABSTRACT

A turbocompound engine has an internal combustion engine with a first recuperation turbine positioned on an exhaust line of the engine. The first turbine provides mechanical power to the engine. Heat from an exhaust line of the first turbine is transferred to a heat recovery system. A second turbine is operated by the heat within the heat recovery system and provides mechanical power to the engine.

6 Claims, 1 Drawing Sheet

ENGINE APPARATUS WITH HEAT RECOVERY SYSTEM AND RELATIVE HEAT RECOVERY METHOD

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates to a turbocompound internal combustion engine, in particular for automotive vehicles, more specifically for industrial vehicles, provided with a heat recovery system.

2. Prior Art

In automotive engines, in particular large diesel engines, such as those for heavy vehicles, the thermal energy of exhaust gases from the engine is recovered in turbines positioned on the exhaust line. The turbines can be utilized to drive compressors positioned on the suction line for supercharging. In turbocompound engines a turbine, usually positioned downstream of a supercharger turbine, supplies mechanical power to the engine through the drive shaft and with a suitable transmission and reduction system, owing to the fact that the rotation speed of the turbine is usually much higher than that of the engine (a few tens of thousands of revolutions per minute), to obtain adequate outputs. In this way performances are improved, also in relation to the production of pollutants.

In any case, the thermal energy is not completely recovered. Even by expanding the gases to the pressure at which they are sent to any treatment systems to be discharged into the environment, they still have residual heat, in the form of sensitive heat (i.e. temperatures even in the order of 300-500° C.). To recover this heat, systems have been utilized in which the heat is transferred, in an exchanger, to a fluid belonging to a closed circuit, equipped with a secondary turbine in which the fluid is expanded recovering power which is usually utilized in an electric generator. The fluid is then recirculated with suitable means to the heat exchanger. If the fluid can be liquefied the heat exchanger is an evaporator. These systems are known and do not require further description.

The use of the secondary turbine to generate electrical energy creates the problem of an increase in the overall dimensions and complexity of the system. It would be desirable to be able to recover heat in a simple and efficient way, utilizing structures already present in the engine apparatus.

BRIEF SUMMARY

The problems identified above have been solved according to the present invention by a turbocompound engine apparatus, in particular an engine apparatus for motor propulsion comprising:

an internal combustion engine;

a first recuperation turbine positioned on the exhaust line of the exhaust gases from the engine suitable to provide mechanical power to the engine;

a heat recover system comprising a closed circuit comprising a working fluid, a heat exchanger positioned on the exhaust line downstream of the first recuperation turbine suitable to allow the transfer of heat from the exhaust gases to the working fluid, a secondary turbine suitable to be operated by the working fluid;

wherein the secondary turbine is suitable to provide mechanical power to the engine.

The invention also relates to a method of recovering the heat of exhaust gases from an internal combustion engine of a turbocompound engine apparatus comprising:

passage of the exhaust gases through a first recuperation turbine suitable to transmit power to the engine;

transfer of heat from the gases delivered from the first recuperation turbine to a working fluid of a closed circuit;

operation of a secondary turbine through the working fluid;

transfer of mechanical power from the secondary turbine to the engine.

The contents of the appended claims form a specific object of the invention.

BRIEF DESCRIPTION OF THE DRAWINGS

The present invention will now be illustrated by means of the detailed description of preferred, although non-exclusive, embodiments, provided purely by way of example, with the aid of the accompanying figures, in which.

DETAILED DESCRIPTION

Figure 1:
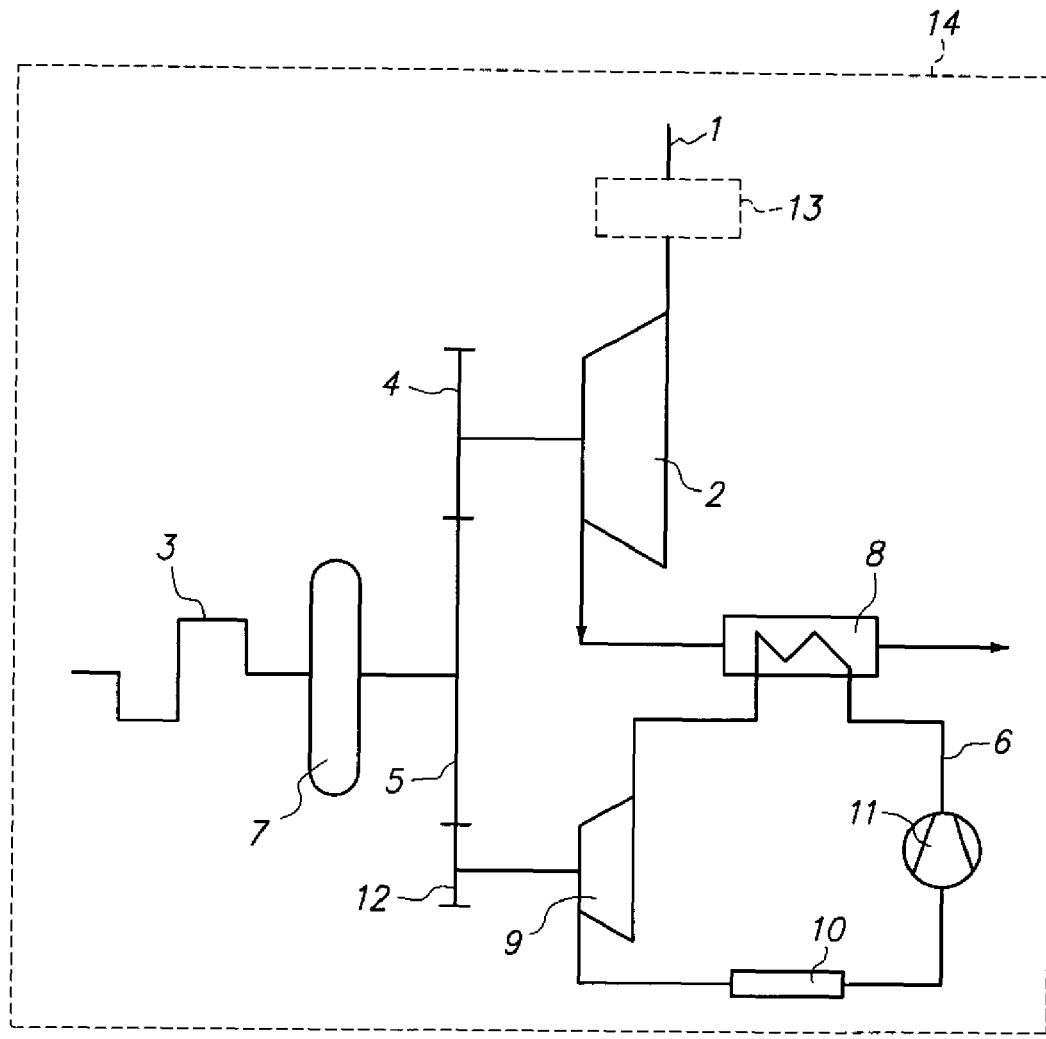
FIG. 1 schematically shows part of the engine apparatus according to the present invention.

With reference of FIG. 1, part of a turbocompound engine apparatus is represented comprising an internal combustion engine (not shown). The exhaust line 1 is suitable to remove exhaust gases from the engine. The first recuperation turbine 2, positioned on the exhaust gas line, is operated by the exhaust gases and is suitable to supply mechanical power to the drive shaft 3, through specific reduction and transmission means; for example, these means can comprise the pair of gears 4 and 5 so as to offer a suitable reduction ratio. As usual, coupling means, for example hydraulic, can be provided, suitable to prevent engine oscillations from being transmitted to the turbine, such as a hydraulic joint 7 or a Voith coupling, anyway systems in which motion is transmitted by a flow of oil and not through transmission with direct mechanical contact. If the engine is supercharged, according to a preferred embodiment of the invention the first recuperation turbine is positioned downstream of the turbine of the turbocharger 13.

The engine apparatus comprises a closed circuit containing a working fluid suitable to circulate therein. In the heat exchanger 8, positioned on the exhaust gas line downstream of the first recuperation turbine, heat can be transferred from the exhaust gases to the working fluid. If the working fluid is of the suitable type (i.e. freon) the heat exchanger 8 can be an evaporator. The working fluid is made to expand in the secondary turbine 9, and then transfers heat for example to the environment, in the cooler 10, which can be, according to a possible embodiment of the invention, a radiator. In the above mentioned case of the working fluid being subject to phase changes, condensation can take place in the cooler 10. Circulation means 11, such as a pump, can be foreseen to allow the fluid to circulate and be recompressed. The means can be driven in a known way, e.g. by the secondary turbine, or by the engine, or by a specific electric motor. The closed circuit for recovery of heat can be produced, with regard to the characteristics described herein, in a known way and does not require further explanations.

Unlike according to the prior art, the secondary turbine is capable of transmitting mechanical power to the engine, i.e. through the drive shaft 3, and various means for transmitting motion, part of which can be those already utilized to transmit power from the first recuperation turbine to the engine. According to the preferred embodiment shown in FIG. 1, a gear 12 can be coupled to the gear 5 connected to the joint 7, or also coupled to the gear 4 of the first recuperation turbine. This layout allows optimal reduction ratios between the engine and each of the turbines. It must be noted that, in general, the secondary turbine is smaller than the first recuperation turbine and preferably operates at a higher speed to obtain optimal outputs.

Figure 2:
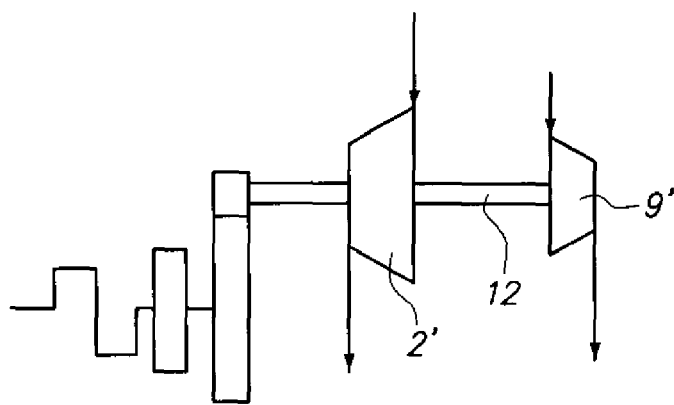
FIG. 2 schematically shows part of the engine apparatus according to a different embodiment of the present invention.

However, other layouts for movement transmission are possible. FIG. 2 represents an alternative layout, suitable in the case in which the secondary turbine 9' has the same speed as the first recuperation turbine 2'. In this case the two turbines can also be keyed onto the same shaft 12.

It must be noted that, according to the present invention, the power of the secondary turbine can be exploited utilizing a large part of the same transmission and reduction systems as the first recuperation turbine, eliminating the need for a specific electric generator, thereby making the system more compact and less expensive.

The invention also relates to a vehicle 14 equipped with an engine apparatus as described above.

What is claimed is:

1. A turbocompound engine apparatus comprising:
an internal combustion engine;
a first recuperation turbine (2, 2') positioned on the exhaust line (1) of the exhaust gases from said engine, the first recuperation turbine mechanically connected to said engine for providing mechanical power to said engine;
a heat recovery system comprising a closed circuit (6) comprising a working fluid, a heat exchanger (8) in thermal communication with the exhaust line downstream of said first recuperation turbine suitable to allow the transfer of heat from the exhaust gases to said working fluid, a secondary turbine (9) operated by said working fluid;
wherein said first recuperation turbine is downstream of a turbine of a turbocharger of the turbocompound engine;
wherein said secondary turbine is mechanically connected to said engine for providing mechanical power to said engine.

2. The turbocompound engine apparatus as claimed in claim 1, wherein the secondary turbine and the first recuperation turbine are connected to the engine through a common hydraulic joint.

3. The turbocompound engine apparatus as claimed in claim 1, wherein the secondary turbine (9) and the first recuperation turbine (2) are connected to the engine through transmission and reduction means (4, 5, 12) with different reduction ratios.

4. The turbocompound engine apparatus as claimed in claim 1, wherein the secondary turbine (9') and the first recuperation turbine (2') are keyed to a common shaft (12).

5. The turbocompound engine apparatus as claimed in claim 1, wherein the secondary turbine and the first recuperation turbine are connected to the engine through gears.

6. The turbocompound engine apparatus for automotive vehicles as claimed in claim 1, wherein the internal combustion engine is a diesel engine.

\* \* \* \* \*